(12) United States Patent
Lee et al.

(10) Patent No.: US 8,055,294 B2
(45) Date of Patent: Nov. 8, 2011

(54) CONTROL OF UPLINK TRANSMIT POWER

(75) Inventors: Chi Hun Lee, Anyang-si (KR); Yong Sang Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 442 days.

(21) Appl. No.: 12/419,964

(22) Filed: Apr. 7, 2009

(65) Prior Publication Data

US 2010/0255868 A1 Oct. 7, 2010

(51) Int. Cl.
*H04B 7/00* (2006.01)

(52) U.S. Cl. ....... 455/522; 455/13.4; 455/501; 455/507; 455/63.1; 455/456.1; 370/310; 370/329; 370/330; 370/342

(58) Field of Classification Search ................. 455/13.4, 455/522, 501, 507, 63.1, 456.1; 370/310, 370/330, 329, 11, 252, 342
See application file for complete search history.

(56) References Cited

U.S. PATENT DOCUMENTS

| | | | |
|---|---|---|---|
| 6,405,021 B1 * | 6/2002 | Hamabe | 455/69 |
| 7,616,596 B2 * | 11/2009 | Lee et al. | 370/326 |
| 7,702,351 B2 * | 4/2010 | Soliman | 455/522 |
| 7,706,804 B2 * | 4/2010 | Huh et al. | 455/450 |
| 7,729,715 B2 * | 6/2010 | Love et al. | 455/522 |
| 7,941,174 B2 * | 5/2011 | Breuer et al. | 455/522 |
| 2009/0285169 A1 * | 11/2009 | Yang et al. | 370/329 |
| 2010/0111008 A1 * | 5/2010 | Ishii | 370/329 |
| 2010/0142455 A1 * | 6/2010 | Imamura | 370/329 |
| 2011/0085513 A1 * | 4/2011 | Chen et al. | 370/330 |
| 2011/0182201 A1 * | 7/2011 | Pajukoski et al. | 370/252 |
| 2011/0188427 A1 * | 8/2011 | Ishii | 370/311 |

OTHER PUBLICATIONS

LG Electronics, Inc., "Update Test Result for A-MPR Estimation for NS07," Jan. 29, 2009.
3rd Generation Partnership Project (3GPP), "3rd Generation Partnership Project; Technical Specification Group Radio Access Network (TSG-RAN); Evolved Universal Terrestrial Radio Access (E-UTRA); User Equipment (UE) Radio Transmission and Reception (Release 8)," 3GPP TS 36.101 V8.4.0, Dec. 2008.
3rd Generation Partnership Project (3GPP), "3rd Generation Partnership Project; Technical Specification Group Radio Access Network (TSG-RAN); Evolved Universal Terrestrial Radio Access (E-UTRA); Physical Layer Procedures (Release 8)," 3GPP TS 36.213 V8.5.0, Dec. 2008.
3rd Generation Partnership Project (3GPP), "3rd Generation Partnership Project; Technical Specification Group Radio Access Network (TSG-RAN); Evolved Universal Terrestrial Radio Access (E-UTRA); Radio Resource Control (RRC); Protocol Specification (Release 8)," 3GPP TS 36.331 V8.4.0, Dec. 2008.
LG Electronics, Inc., "Analysis on A-MPR Values for NS07," 3GPP TSG RAN WG4 Meeting #49-bis, R4-090039, Jan. 12, 2009.

\* cited by examiner

*Primary Examiner* — Linh Nguyen
(74) *Attorney, Agent, or Firm* — Lee, Hong, Degerman, Kang & Waimey

(57) ABSTRACT

A method and apparatus of controlling an uplink transmit power are provided. A maximum power reduction (MPR) is determined based on resource allocation. The resource allocation comprises a number of contiguous resource blocks in a channel bandwidth which is divided into a first region, a second region and a third region. The MPR is determined according to the number of the contiguous resource blocks in the first region and the third region, and the MPR is determined according to the starting index in the second region. The MPR in the third region increases as the number of the contiguous resource blocks decreases.

20 Claims, 14 Drawing Sheets

CONTROL OF UPLINK TRANSMIT POWER

BACKGROUND

1. Field of the Invention

The present invention relates to wireless communication and, more particularly, to an apparatus and method for controlling an uplink transmit power in a wireless communication system.

2. Related Art

Wireless communication systems are widely spread all over the world to provide various types of communication services such as voice or data. In general, the wireless communication system is a multiple access system capable of supporting communication with multiple users by sharing available system resources (e.g., bandwidth, transmit (Tx) power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

The proliferation of wireless communication systems has created system interoperability problems, degrades efficiency of spectrum utilization, and increases the cost of communication services. Spurious emissions are emissions which are caused by unwanted transmitter effects such as harmonics emission, parasitic emissions, intermodulation products and frequency conversion products. The spurious emissions may cause interference between adjacent frequency bands.

3rd generation partnership project (3GPP) long term evolution (LTE) is a part of an evolved-universal mobile telecommunications system (E-UMTS). The evolved-UMTS Terrestrial Radio Access (E-UTRA) is the air interface of 3GPP LTE. E-UTRA employs the OFDMA in downlink and employs the SC-FDMA in uplink. E-UTRA supports various frequency bands. Some E-UTRA band may be adjacent to other system's frequency band. In the adjacent E-UTRA band, the spurious emissions by a transmitter may cause interference with the other system's frequency band.

A public safety band (PSB) is a regulated spectrum exclusively to public safety. The PSB may be defined in a 700 MHz or 4.9 GHz band. Police departments, fire departments, emergency medical services and other emergency responders may rely on point-to-point and point-to-multipoint communications systems operating in the PSB. The integrity and reliability of many of these public service networks are critical in emergencies.

When an E-UTRA band is adjacent to the PSB, the interference due to the spurious emissions may be caused. To guarantee the reliability of the PSB, a transmit power needs to be adjusted by taking into account for the spurious emissions.

SUMMARY

The present invention provides an apparatus and method for controlling an uplink transmit power in a wireless communication.

In an aspect, a method of controlling an uplink transmit power in a wireless communication is provided. The method may be performed by a user equipment (UE). The method includes acquiring a resource allocation for uplink transmission from a base station (BS), determining a maximum power reduction (MPR) based on the resource allocation, adjusting a maximum output power by using the MPR, determining a transmit power of a uplink channel within the adjusted maximum output power; and transmitting an uplink data on the uplink channel. The resource allocation comprises a number of contiguous resource blocks in a channel bandwidth and a starting index which is an index of a resource block with the lowest index among the contiguous resource blocks. The channel bandwidth is divided into a first region, a second region and a third region. The MPR is determined according to the number of the contiguous resource blocks in the first region and the third region, and the MPR is determined according to the starting index in the second region. The MPR in the third region increases as the number of the contiguous resource blocks decreases.

The first region may include a resource block with smallest index among entire resource blocks in the channel bandwidth, and the third region may include a resource block with largest index among the entire resource blocks. The nearest region from a public safety band may be the first region. The public safety band may be ranged from 769 MHz to 775 MHz.

The number of the entire resource blocks in the channel bandwidth may be 50. The first region may include resource blocks with indexes ranged from #0 to #12, the second region may include resource blocks with indexes ranged from #13 to #36, and the third region may include resource blocks with indexes ranged from #37 to #49.

The channel bandwidth may be 10 MHz. An operating band for the channel bandwidth may be ranged from 777 MHz to 787 MHz.

The MPR may be determined in the third region by following equation:

$$CB - CC * \log_{10}(CRB)$$

where CB and CC are parameters and CRB is the number of contiguous resource blocks.

The MPR in the second region may be defined when the number of contiguous resource blocks is larger than a threshold. The second region may be divided into two parts according to the starting index and the thresholds for each part are differently defined. The MPR in the second region may be set to zero when the staring index is near the boundary of the third region.

In another aspect, a transmitter includes a transmit circuitry to transmit a transmit signal, a power controller configured to determine a MPR based on resource allocation, adjust a maximum output power by using the MPR, and determine a transmit power of the transmit signal within the adjusted maximum output power, wherein the resource allocation comprises a number of contiguous resource blocks in a channel bandwidth and a starting index which is an index of a resource block with the lowest index among the contiguous resource blocks, and the channel bandwidth is divided into a first region, a second region and a third region, wherein the MPR is determined according to the number of the contiguous resource blocks in the first region and the third region, and the MPR is determined according to the starting index in the second region, wherein the MPR in the third region increases as the number of the contiguous resource blocks decreases.

DESCRIPTION OF EXEMPLARY EMBODIMENTS

The technique, method and apparatus described below can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The wireless access technologies can be implemented with various wireless communication standard systems. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as IEEE 802.11 (Wi-Fi), IEEE 802.16 (WiMAX), IEEE 802-20, E-UTRA (Evolved-UTRA) etc. 3rd generation partnership project (3GPP) long term evolution (LTE) is a part of an evolved-universal mobile telecommunications system (E-UMTS). The evolved-UMTS Terrestrial Radio Access (E-UTRA) is the air interface of 3GPP LTE. E-UTRA employs the OFDMA in downlink and employs the SC-FDMA in uplink. LTE-advance (LTE-A) is an evolution of the LTE.

For clarity, the following description will focus on the 3GPP LTE/LTE-A. However, technical features of the present invention are not limited thereto.

The contents of following documents are hereby incorporated by reference:

3GPP TS 36.101 V8.4.0 (2008-12) "Evolved Universal Terrestrial Radio Access (E-UTRA); User Equipment (UE) radio transmission and reception (Release 8)";

3GPP TS 36.213 V8.5.0 (2008-12) "Evolved Universal Terrestrial Radio Access (E-UTRA); Physical layer procedures (Release 8)"; and 3GPP TS 36.331 V8.4.0 (2008-12) "Evolved Universal Terrestrial Radio Access (E-UTRA); Radio Resource Control (RRC); Protocol specification (Release 8)".

Figure 1:
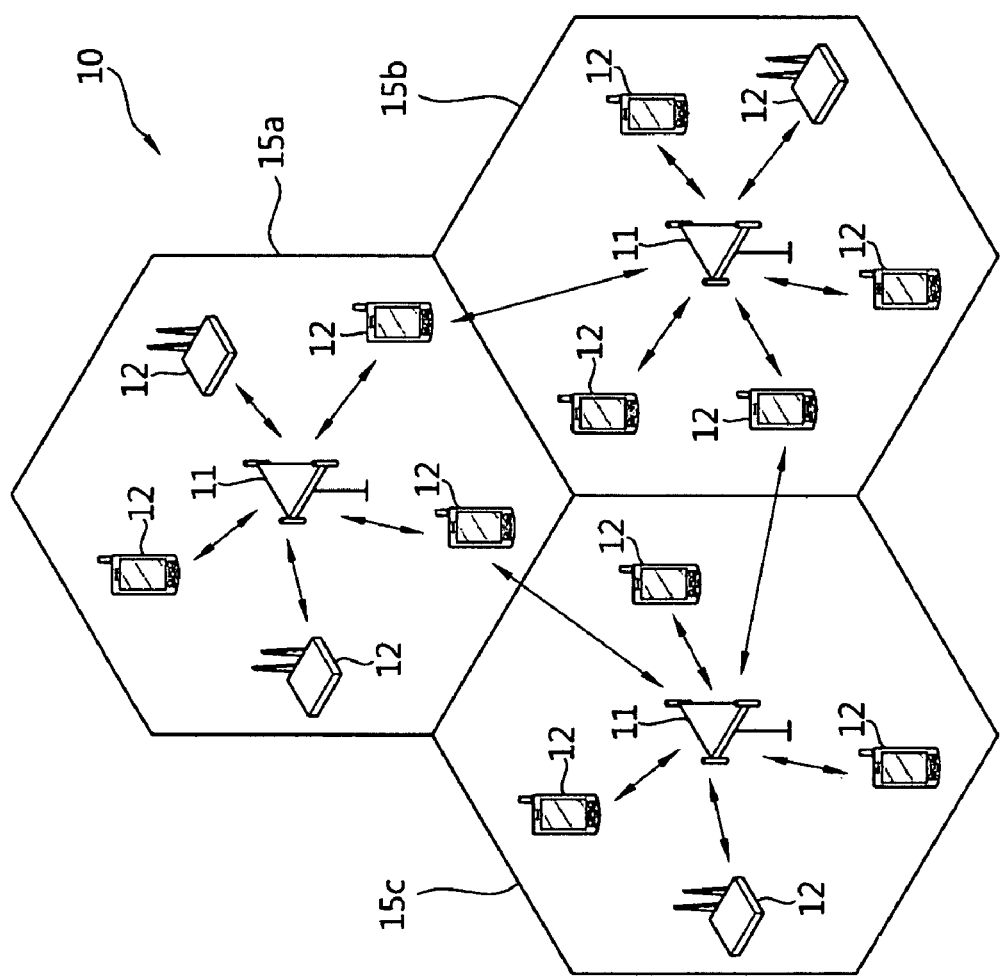
FIG. 1 shows a wireless communication system.

FIG. 1 shows a wireless communication system. A wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a access terminal, a handheld device, etc. The BS 11 is generally a fixed station that communicates with the UE 12 and may be referred to as another terminology, such as an evolved node-B (eNB), a base transceiver system (BTS), an access point, etc.

Hereinafter, downlink denotes communication link from the BS to the UE, and uplink denotes communication link from the UE to the BS. In the downlink, a transmitter may be a part of the BS, and a receiver may be a part of the UE. In the uplink, the transmitter may be a part of the UE, and the receiver may be a part of the BS.

Figure 2:
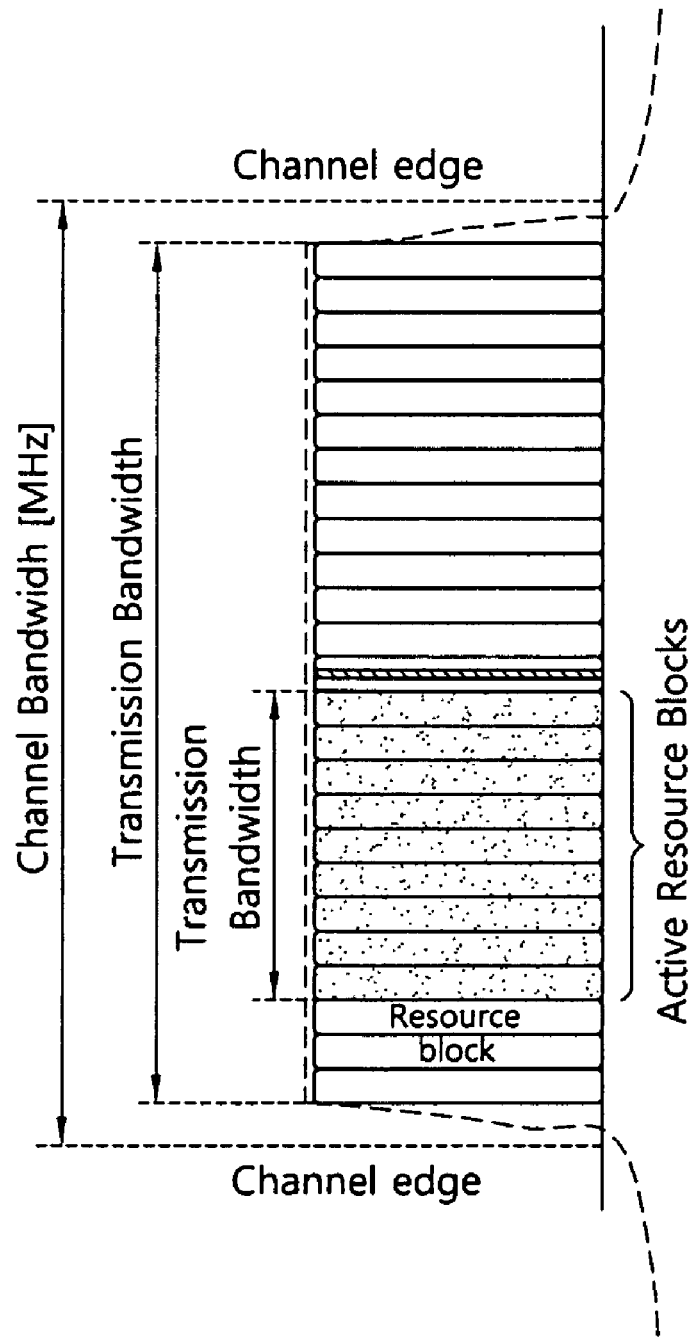
FIG. 2 shows a bandwidth configuration for E-UTRA of 3GPP LTE.

FIG. 2 shows a bandwidth configuration for E-UTRA of 3GPP LTE. Following terms are defined.

Channel bandwidth: a radio frequency (RF) bandwidth supporting a single E-UTRA RF carrier with the transmission bandwidth configured in the uplink or downlink of a cell. The channel bandwidth is measured in MHz and is used as a reference for transmitter and receiver RF requirements.

Channel edge: The lowest and highest frequency of the carrier, separated by the channel bandwidth.

Transmission bandwidth: Bandwidth of an instantaneous transmission from a UE or BS, measured in resource block units.

Resource block: a resource allocation unit defined as consecutive SC-FDMA symbols (or OFDMA symbols) in time domain and consecutive subcarriers in frequency domain.

In 3GPP TS 36.101 V8.4.0 (2008-12), the operating bands of E-UTRA are defined as shown in Table 1.

TABLE 1

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1452.9 MHz | 1475.9 MHz-1500.9 MHz | FDD |
| 12 | 698 MHz-716 MHz | 728 MHz-746 MHz | FDD |
| 13 | 777 MHz-787 MHz | 746 MHz-756 MHz | FDD |

TABLE 1-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 14 | 788 MHz-798 MHz | 758 MHz-768 MHz | FDD |
| ... | | | |
| 17 | 704 MHz-716 MHz | 734 MHz-746 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

E-UTRA supports various channel bandwidths as shown in Table 2.

TABLE 2

| | Channel bandwidth $BW_{Channel}$ [MHz] | | | | | |
|---|---|---|---|---|---|---|
| | 1.4 | 3 | 5 | 10 | 15 | 20 |
| Maximum number of resource blocks $N_{RB}$ | 6 | 15 | 25 | 50 | 75 | 100 |

From Table 1 and Table 2, the channel bandwidth for E-UTRA operating band 13 is 10 MHz, the UL operating band for E-UTRA operating band 13 ranges 777 MHz-787 MHz, and DL operating band ranges 746 MHz-756 MHz.

Figure 3:
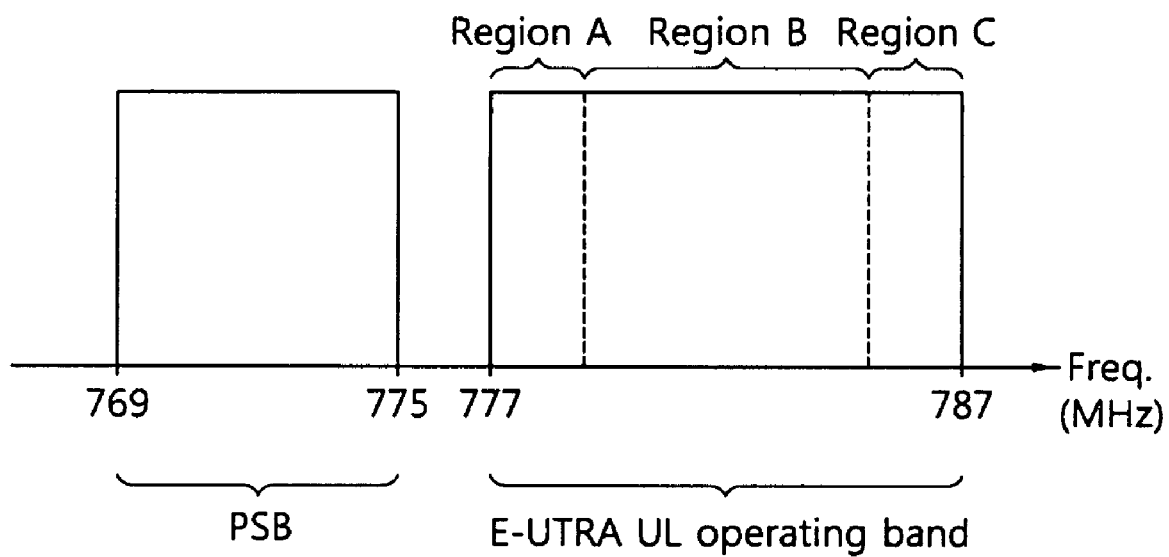
FIG. 3 shows a relation between E-UTRA operating band 13 and public safety band.

FIG. 3 shows a relation between E-UTRA operating band 13 and public safety band. Since the public safety band (PSB) ranges 769 MHz-775 MHz, the PSB is adjacent to the E-UTRA UL operating band 13. This means that spurious components for UL transmission may affect the PSB.

There are many sources to cause spurious components. Local leakage arises in a conventional quadrature modulator. The quadrature modulator modulates a baseband signal to a inphase (I) sigan which has same phase with a phase of a local oscillator and a quadrature (Q) signal which has 90 degree shifted phase with the phase of the local oscillator. In the modulation, a leaked local component is inputted to a mixer together with the baseband signal. Various intermodulations occur due to the mixer's non-linear characteristics. Among spurious components due to the intermodulations, the $3^{rd}$ order intermodulation (IM3) may gives largest effect to a adjacent band. Various forms of the IM3 may be generated according to the number of resource blocks (RBs) and/or positions of the RBs.

To search the effect of spurious components and to get a appropriate MPR (maximum power reduction), a channel bandwidth is divided into three regions. Nearest region from the PSB is called a Region A (a first region), a Region B (a second region) is next to the Region A, and a Region C (a third region) is farthest region from the PSB. Each region may be identified with a starting index. For example, it is assumed that there are 50 RBs in the channel bandwidth 50 MHz and each RB has an index ranged from #0 to #49. The starting index of the Region A may be #0, the starting index of the Region B may be #13, and the starting index of the Region B may be #37.

In 3GPP TS 36.101 V8.4.0 (2008-12), a reference maximum output power for each E-UTRA band is defined as 23 dBm with ±2 dB tolerance. The reference maximum output power may vary UE's power class. The MPR restricts the reference maximum output power to reduce effects of the spurious components. The maximum output power for uplink transmission becomes the reference maximum output power—MPR.

Hereinafter, a MPR is proposed to restrict the effect of the spurious components below −60 dBm/12.5 KHz.

First, we present relation between local leakage level and IM3. To present typical quadrature modulator characteristics to see the general behaviors of output inter-modulation products at the quadrature modulators, two different quadrature modulator examples available in the market are considered. These are NEC's UPC 8110GR and Analog device's AD8349. Both components are widely used for digital cellular phone applications (GSM, EDGE, WCDMA, and CDMA2000). Local leakage power level is adjusted by DC offset level of I, Q input signals. We find out that LO leakage power cannot make change the IM3 level.

Figure 4A:
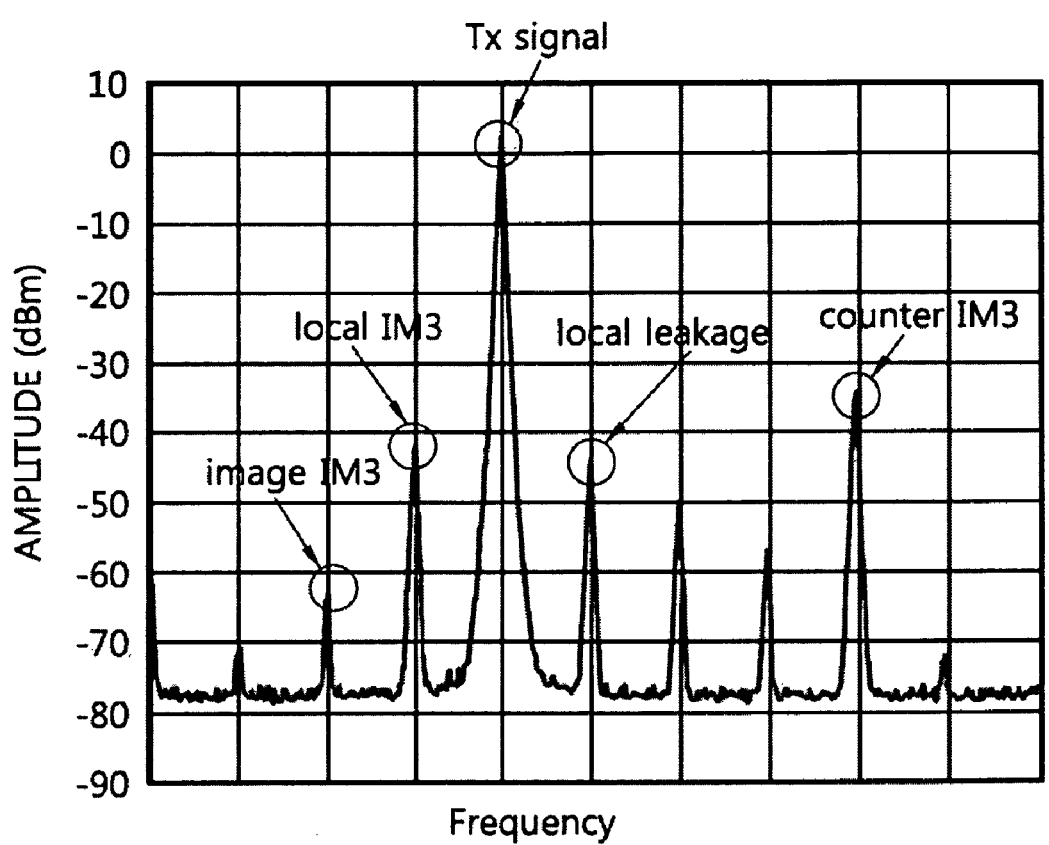
FIG. 4A shows an output spectrum showing various IM3 generated by a transmit signal.
Figure 4B:
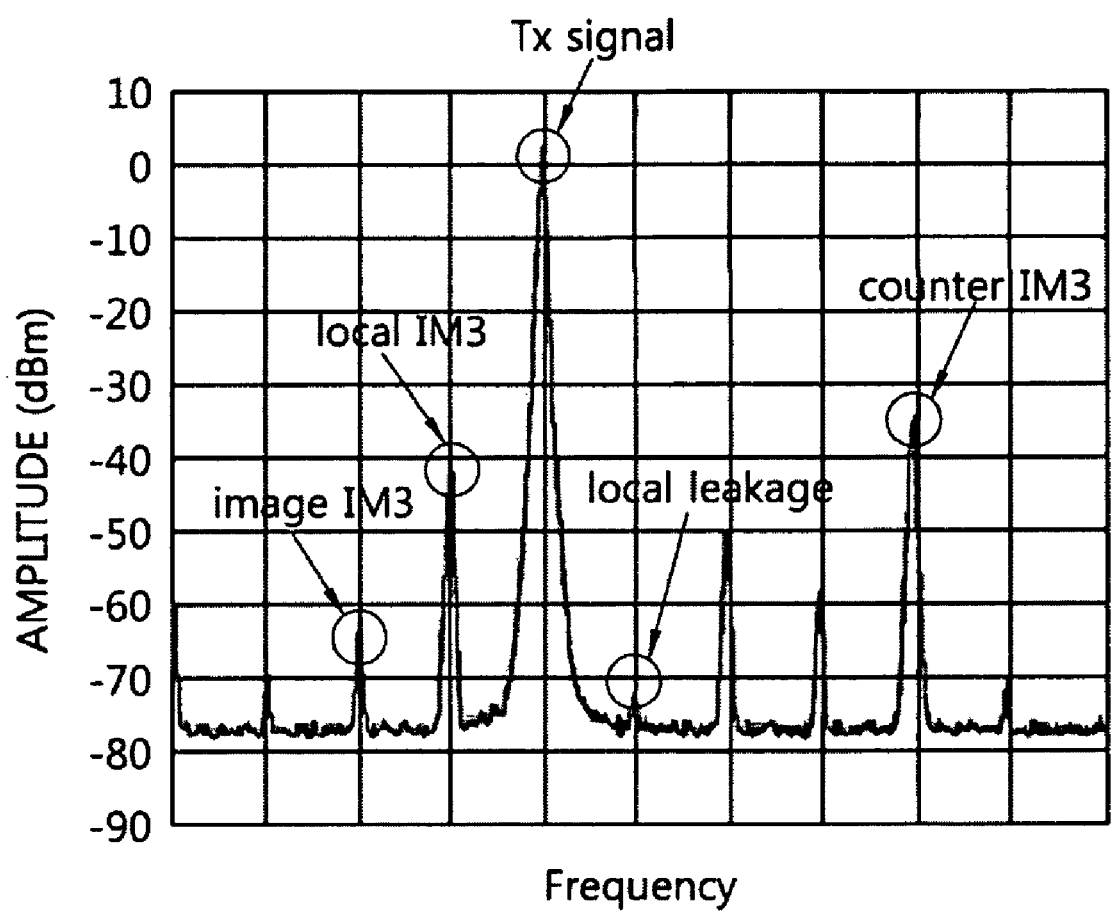
FIG. 4B shows the output spectrum after reducing the local leakage power level.

FIG. 4A shows an output spectrum showing various IM3 generated by a transmit signal. A local leakage power level is shown −44.5 dBm. IM3 includes local IM3, image IM3 and/or counter IM3. When the local leakage appears at the one side of a transmit (TX) signal, the local IM3 and the image IM3 appear at the other side of the TX signal. The image IM3 is farther than the local IM3 from the TX signal. The counter IM3 appears same side with the local leakage. In this example, the amplitude of counter IM3 is −36.8 dBc. The nominal local leakage power level can be reduced further by applying DC offset compensation voltage on the I and Q inputs. FIG. 4B shows the output spectrum after reducing the local leakage power level. We can notice that when we reduced the local leakage power level by −71.4 dBm, the amplitude of counter IM3 is still remained at −36.8 dBc. This means that although local leakage power level can be minimized by optimizing the DC offset of I or Q inputs, the amplitude of counter IM3 is not varied even for drastic reduction in the local leakage power level.

Figure 5A:
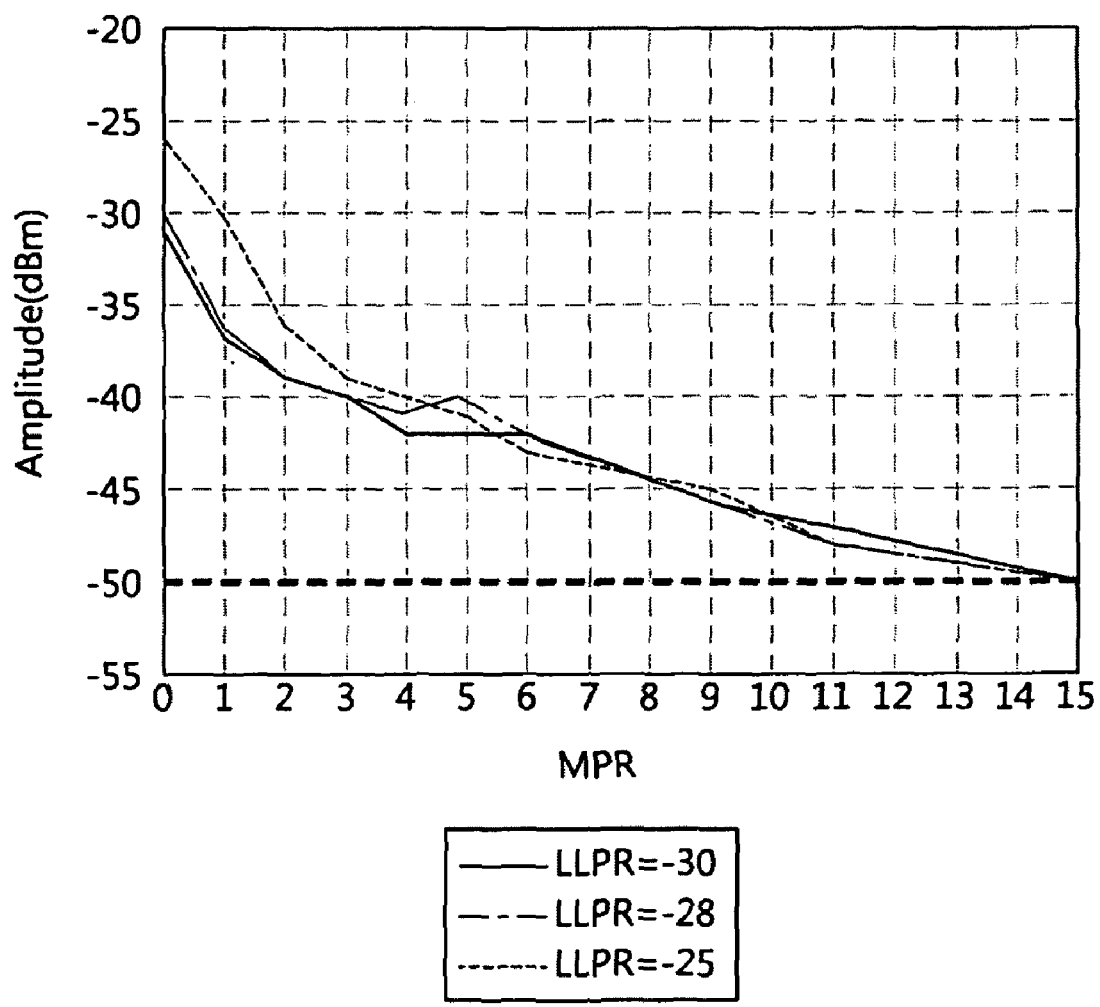
FIGS. 5A and 5B show impacts of local leakage on IM3 in a Region A.
Figure 5B:
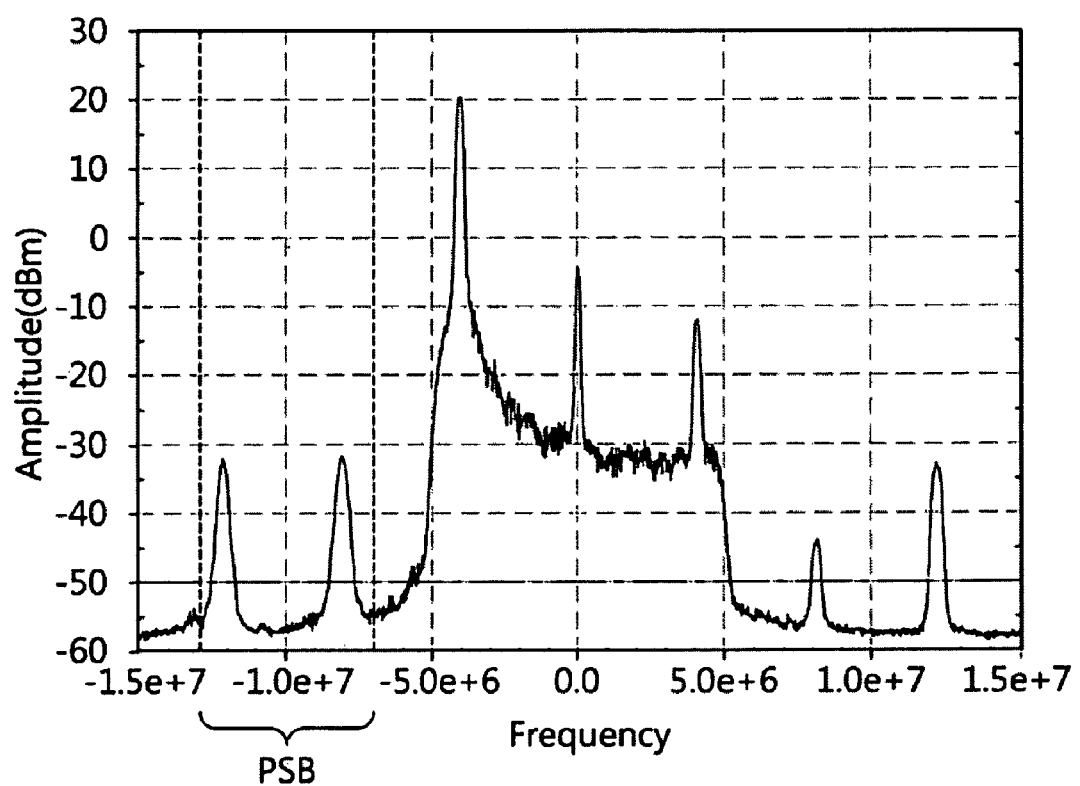

FIGS. 5A and 5B show impacts of local leakage on IM3 in a Region A. The region A includes resource blocks having a range from resource block index #0 to resource block index #12. We traced IM3 spurious power level experimentally while a MPR is increasing at each local leakage power ratio (LLPR) (−25/−28/−30 dBc). It is assumed that single resource block transmission. In FIG. 5A, it shows that local leakage power does not affect on IM3 especially at the High MPR since the amplitude of IM3 is logarithmically decreased with MPR regardless of the LLPR. At the low MPR (MPR<5), IM3 can be regenerated by a power amplifier. This means that the IM3 is impacted by LLPR only in low MPR.

The relaxation of LLPR is not helpful in Region A. In FIG. 5B, the IM3, especially local IM3 and image IM3, gives a significant effect on the PSB.

Figure 6A:
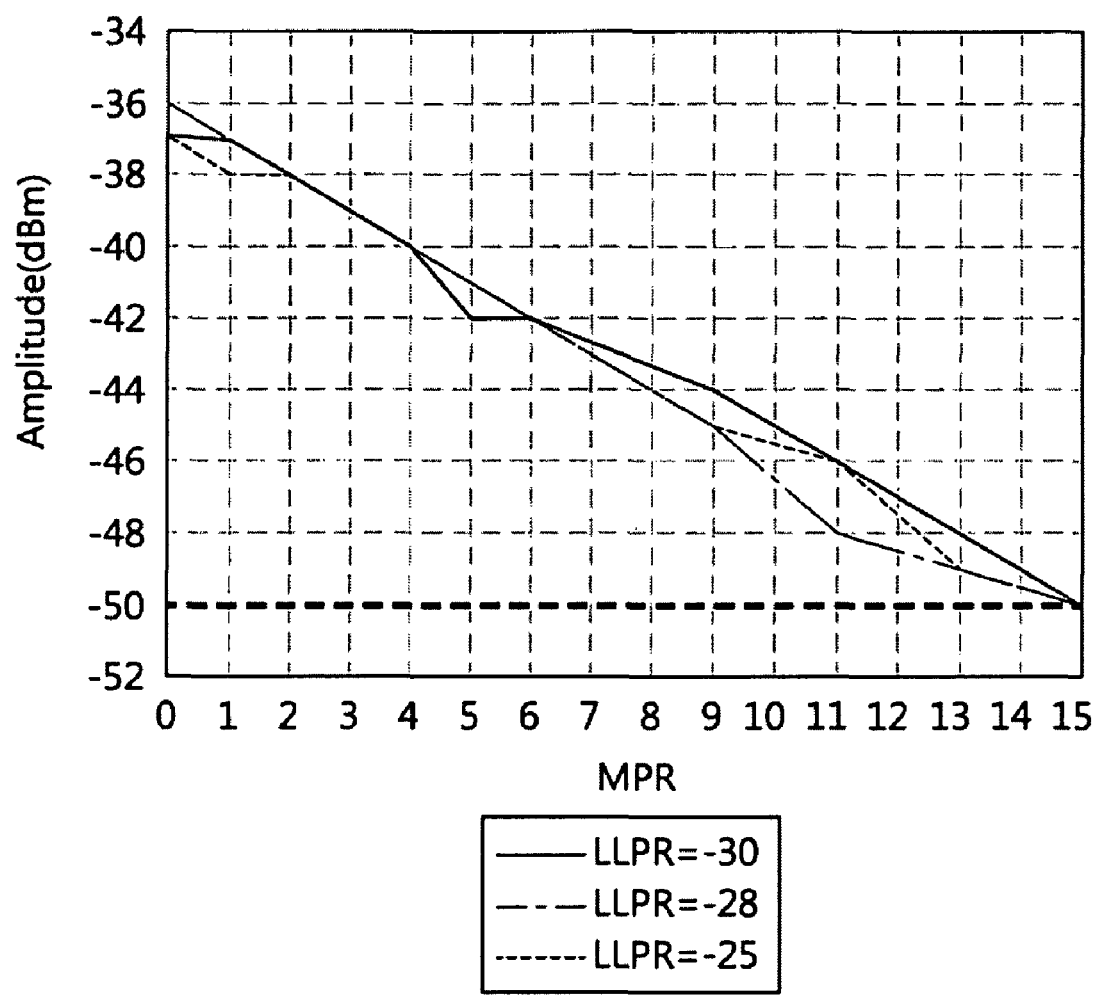
FIGS. 6A and 6B show impacts of local leakage on IM3 in a Region C.
Figure 6B:
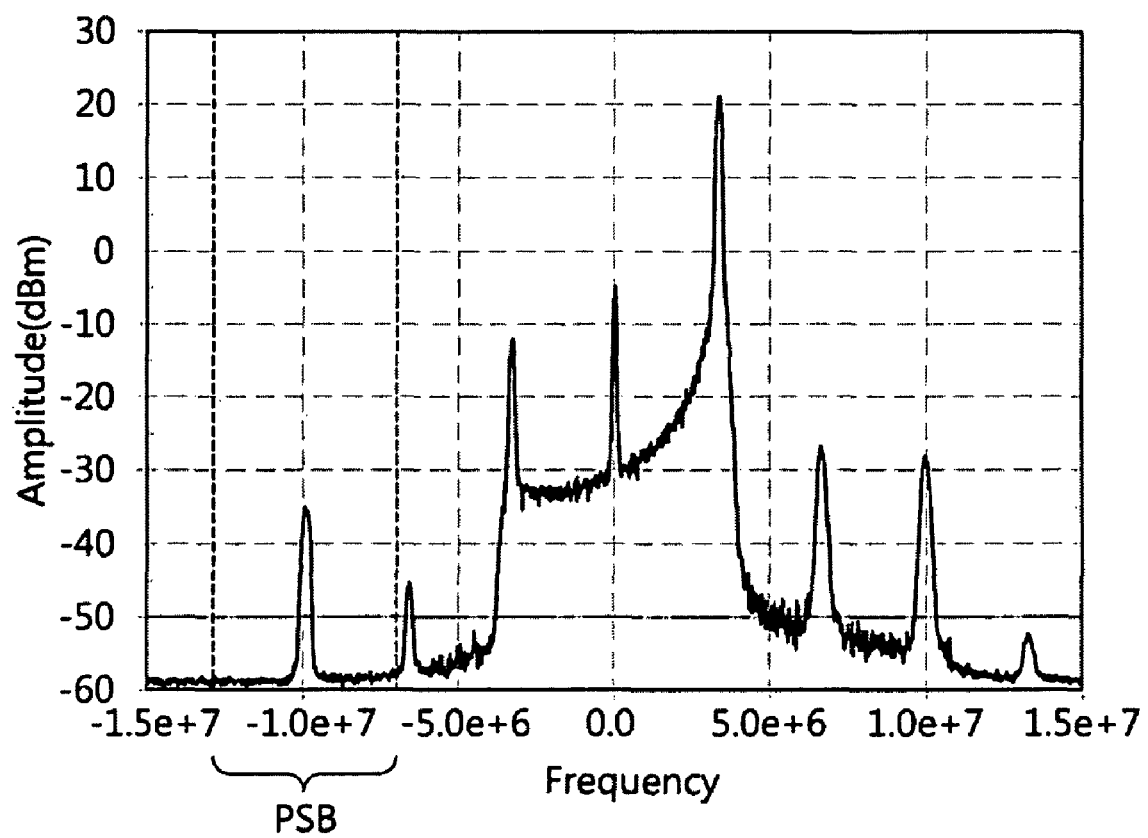

FIGS. 6A and 6B show impacts of local leakage on IM3 in a Region C. The Region C includes resource blocks having a range from resource block index #37 to resource block index #49. We traced IM3 spurious power level experimentally while a MPR is increasing at each local leakage power ratio (LLPR) (−25/−28/−30 dBc). It is assumed that single resource block transmission. In FIG. 6A, it shows that local leakage power does not affect on counter IM3 especially at the High MPR since the amplitudes of counter IM3 are logarithmically decreased with MPR regardless of the local leakage power ratio. The counter IM3 cannot be regenerated by a power amplifier. This means that the counter IM3 is not impacted by the LLPR. The relaxation of LLPR is not helpful in Region C. In FIG. 6B, the counter IM3 gives a significant effect on the public safety band.

Significant reduction of UE's transmission power may decrease the uplink capacity. The improvement of the spectral efficiency to maximize the system capacity is proposed. In addition, we also look at the impact of local leakage power ratio to the level of IM3 and other spurious components to see the effectiveness of tightening the local leakage power ratio requirement from −25 dBc.

An example of proposed MPR values is shown in Table 3.

TABLE 3

|  | Region A | | Region B | | Region C |
| --- | --- | --- | --- | --- | --- |
| Starting index $RB_{start}$ | [0-12] | | [13-18] | [19-36] | [37-49] |
| The number of contiguous resource blocks CRB | [6-8] | [1-5] [9-50] | ≧[8] | >CA-$RB_{start}$ | ≧1 |
| MPR (dB) | [8] | [15] | [11] | [6] | CB − CC * $\log_{10}$(CRB) |

The number of contiguous resource blocks, CRB, is the number of allocated resource blocks in a channel bandwidth. A starting index, $RB_{start}$, is an index of a resource block with the lowest index among the contiguous resource blocks. CA, CB and CC are parameters which may be pre-determined or given by an upper layer signal such as system information or a radio resource control (RRC) message, etc.

Figure 7:
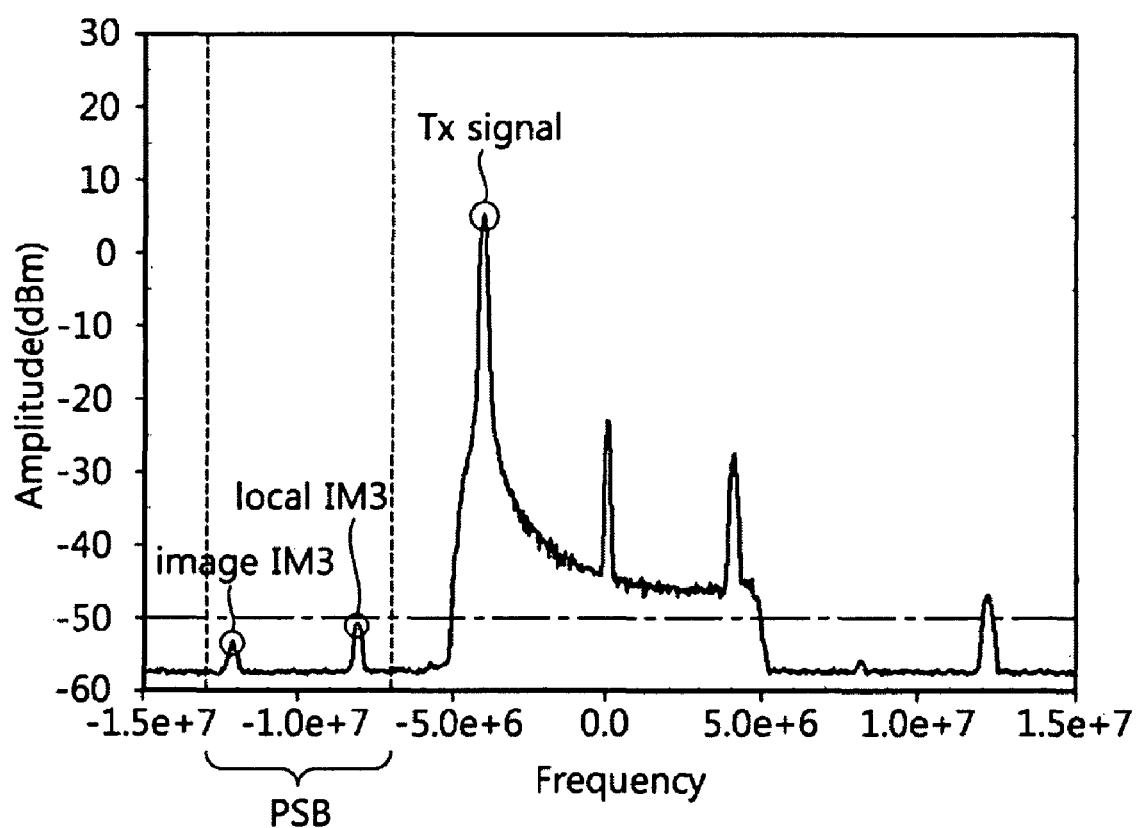
FIG. 7 shows a graph of spectral measurement for a single resource block transmission in the Region A.

The Region A may be divided into two parts according the number of contiguous resource blocks CRB. The first part of the Region A is defined for 6 to 8 resource blocks and the second part of Region A is defined for other resource blocks. The MPR value for the first part of the Region A is 8 and the MPR value for the second part of the Region A is 15. The MPR value for the first part of the Region A is smaller than the MPR value for the second part of the Region A. In the first part of the Region A, IM3 may be minimized at the PSB with smaller MPR. The second part of the Region A requires 15 dB MPR. Further optimization of MPR values in the second part is not helpful because there is only 2 MHz separation between region A and the public safety band. FIG. 7 shows a graph of spectral measurement for a single resource block transmission in the Region A. This graph is obtained by 15 dB MPR from Table 3 when a starting index is #1 and CRB is 1. There are a little local IM3 located at near the upper edge of PSB and image IM3 located at the lower edge of PSB. The amplitude of the local IM3 is larger than the amplitude of the image IM3. The dominant factor in the Region A is the local IM3. Single resource block transmission in the Region A requires 15 dB MPR to suppress the local IM3 below the emission requirement.

Figure 8A:
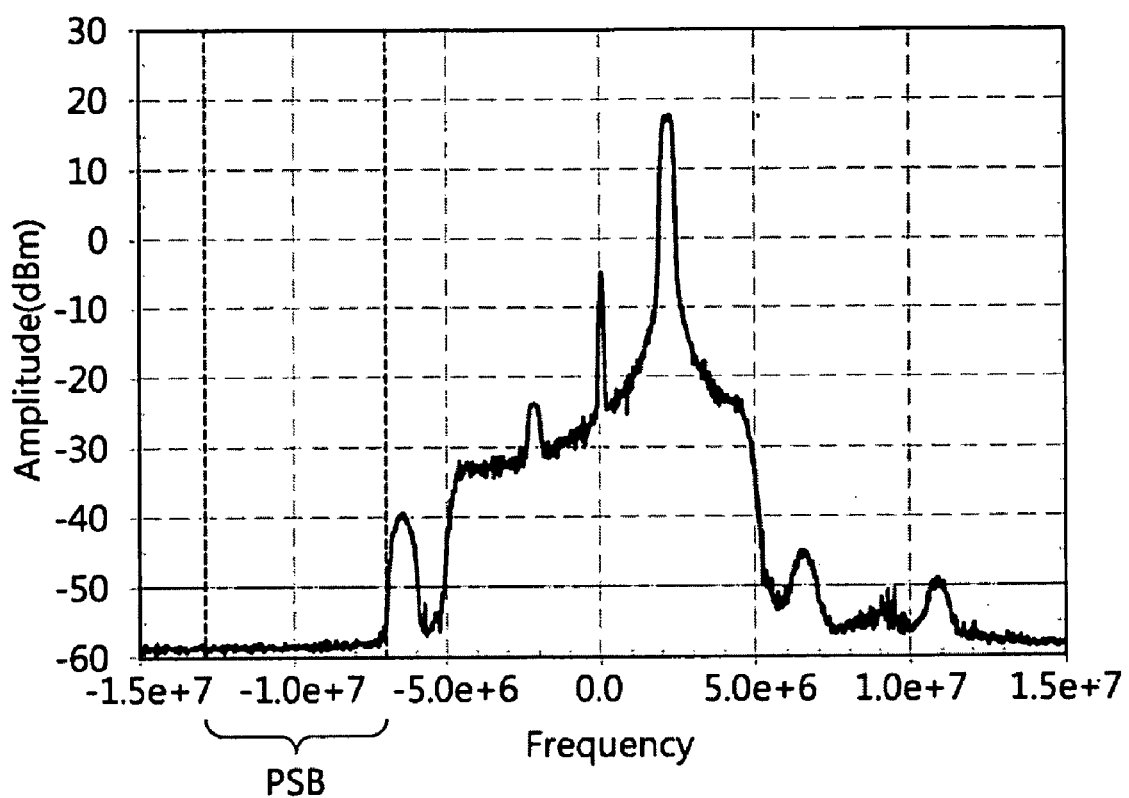
FIG. 8A shows boundary condition of 0 MPR region.
Figure 8B:
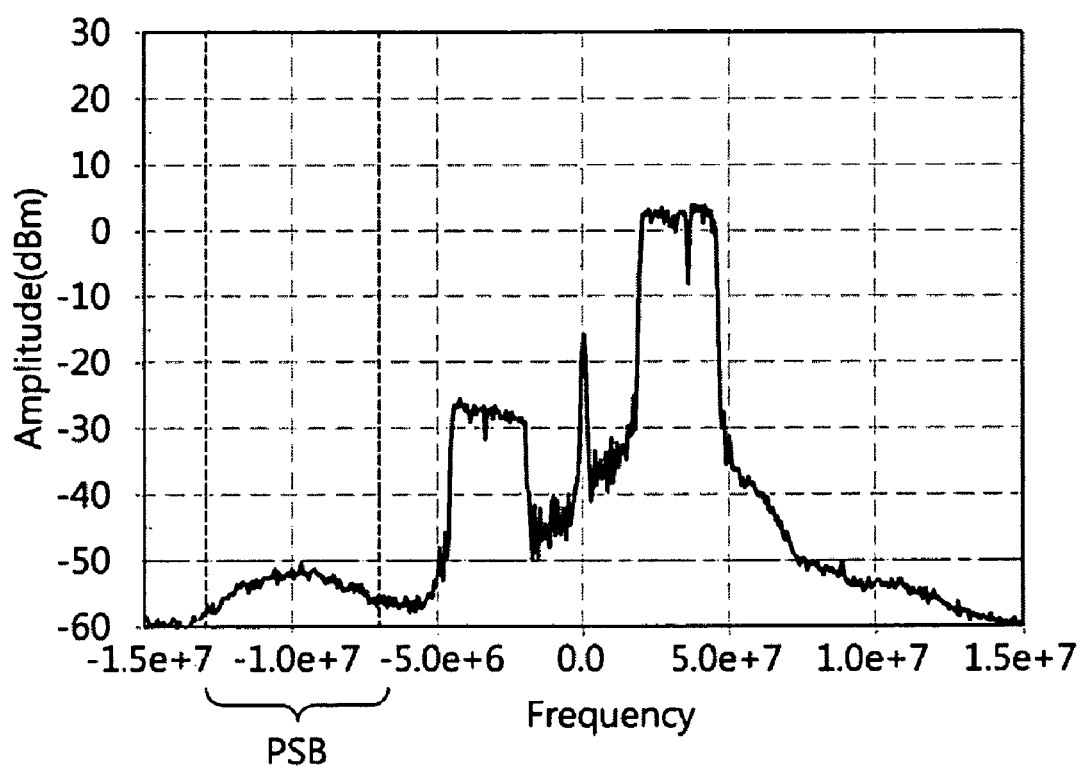
FIG. 8B shows the worst case of B+C cross region allocation.

The Region B may be divided into two parts according to the starting index. The first part of the Region B having indexes ranged from #13 to #18 requires no MPR for CRB<8 and 11 dB MPR for CRB≧8. At the second part of the Region B having indexes ranged from #19 to #36, MPR depends on the starting index. The MPR is defined when the number of contiguous resource blocks is larger than a threshold. The first threshold for the first part is 8 and the second threshold for the second part is CA-$RB_{start}$. The value of CA may be set to the smallest index larger than the largest index in the Region B so that no MPR is defined at the maximum CRB by taking into account for the counter IM3 for when the cross region (B+C) allocation is considered. This means that the MPR is set to zero when the staring index is near the boundary of the Region C. It is noted that the counter IM3 is considered in MPR for cross Region B+C allocation. Since the largest index in the Region B is #36, CA may be set to 37. This can be formulated as CRB≦37−$RB_{start}$. This formula actually confines the CRB not allowing cross region B+C allocation with 0 MPR. FIG. 8A shows boundary condition of 0 MPR region ($RB_{start}$=36, CRB=2). This case needs to be excluded because the counter IM3 is too close to the PSB. This means that the formula for the second part of region B, 37−$RB_{start}$ is appropriate. FIG. 8B shows the worst case of B+C cross region allocation case ($RB_{start}$=36, CRB=14). As seen in the spectral data, 6 dB MPR is required to reduce the counter IM3 components down to the target emission level. Therefore, for the case of CRB>37−$RB_{start}$, 6 dB MPR is required.

The Region C is defined by taking into account for the counter IM3 so that the counter IM3 is not allocated at the PSB due to transmission at the Region C. It is noted that the MPR is a function of spectral density in the Region C. This means that smaller CRB cause large MPR and the MPR is reduced as CRB increases. The MPR increases as CRB decreases. The MPR may be formulated as CB−CC*$\log_{10}$(CRB). When CB is 15 and CC is 0.8, the resultant MPR with different CRB case is shown in Table 4.

TABLE 4

| | MPR | | | | | | | | | | | |
| --- | --- | --- | --- | --- | --- | --- | --- | --- | --- | --- | --- | --- |
| | 15.0 | 12.6 | 11.2 | 10.2 | 9.4 | 8.8 | 8.2 | 7.8 | 7.4 | 7.0 | 6.7 | 6.4 | 6.1 |
| CRB | 1 | 2 | 3 | 4 | 5 | 6 | 7 | 8 | 9 | 10 | 11 | 12 | 13 |

Figure 9:
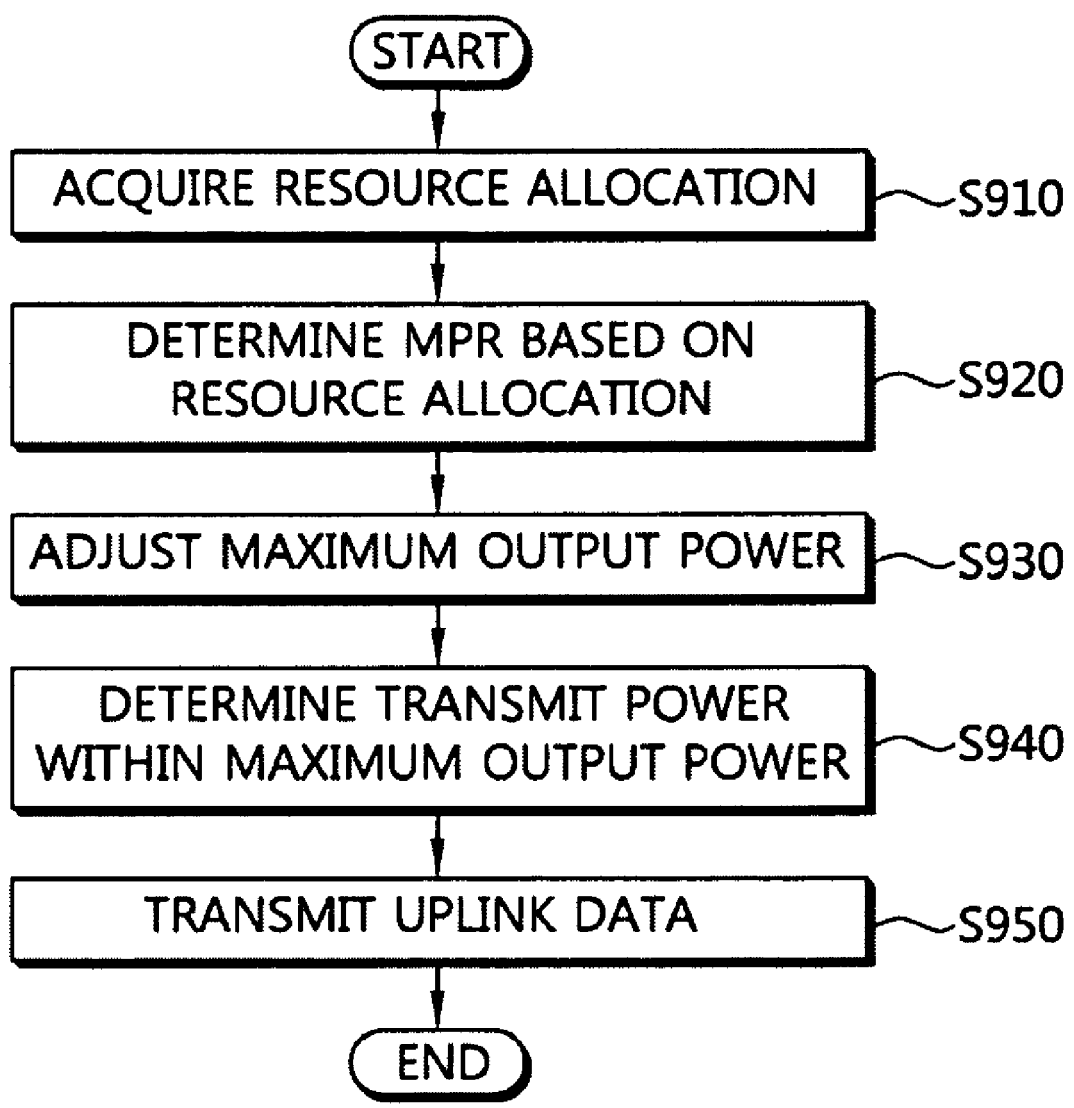
FIG. 9 shows a method of controlling an uplink transmit power according to an embodiment of the present invention.

FIG. 9 shows a method of controlling an uplink transmit power according to an embodiment of the present invention. This method may be performed by a UE. In step S910, a UE acquires a resource allocation for uplink transmission from a BS. The resource allocation may be referred to as an uplink grant and be received on a physical downlink control channel (PDCCH). The resource allocation may include a number of contiguous resource blocks in a channel bandwidth and a starting index. The starting index may be an index of a resource block with the lowest index among the contiguous resource blocks.

The channel bandwidth may be divided into a first region (Region A), a second region (Region B) and a third region (Region C). The first region may include resource blocks with indexes ranged from #0 to #12. The second region may include resource blocks with indexes ranged from #13 to #36. The third region may include resource blocks with indexes ranged from #37 to #49. The first region may include a resource block with smallest index among entire resource blocks in the channel bandwidth, and the third region may include a resource block with largest index among the entire resource blocks. The nearest region from a PSB may be the first region. The PSB may be ranged from 769 MHz to 775 MHz. The number of the entire resource blocks in the channel bandwidth may be 50 so that the channel bandwidth is 10 MHz. An operating band for the channel bandwidth may be ranged from 777 MHz to 787 MHz.

In step S920, a MPR is determined based on the resource allocation. The MPR may be determined according to Table 3. The MPR may be determined according to the number of the contiguous resource blocks in the first region and the third region. The MPR may be determined according to the starting index in the second region. The MPR in the third region may increase as the number of the contiguous resource blocks decreases.

In step S930, a maximum output power is adjusted by using the MPR. When the maximum output power is 23 dBm and determined MPR is 6 dB, the adjusted maximum output power is obtained by subtracting the determined MPR from the maximum output power.

In step S940, a transmit power of a uplink channel is determined within the adjusted maximum output power. An example of setting of a transmit power for physical uplink control channel (PUCCH) and physical uplink shared channel (PUSCH) is disclosed in the section 5.1 of 3GPP TS 36.213 V8.5.0 (2008-12). The transmit power for PUCCH and PUSCH cannot be larger than the adjusted maximum output power.

In step S950, an uplink data is transmitted on the uplink channel.

Figure 10:
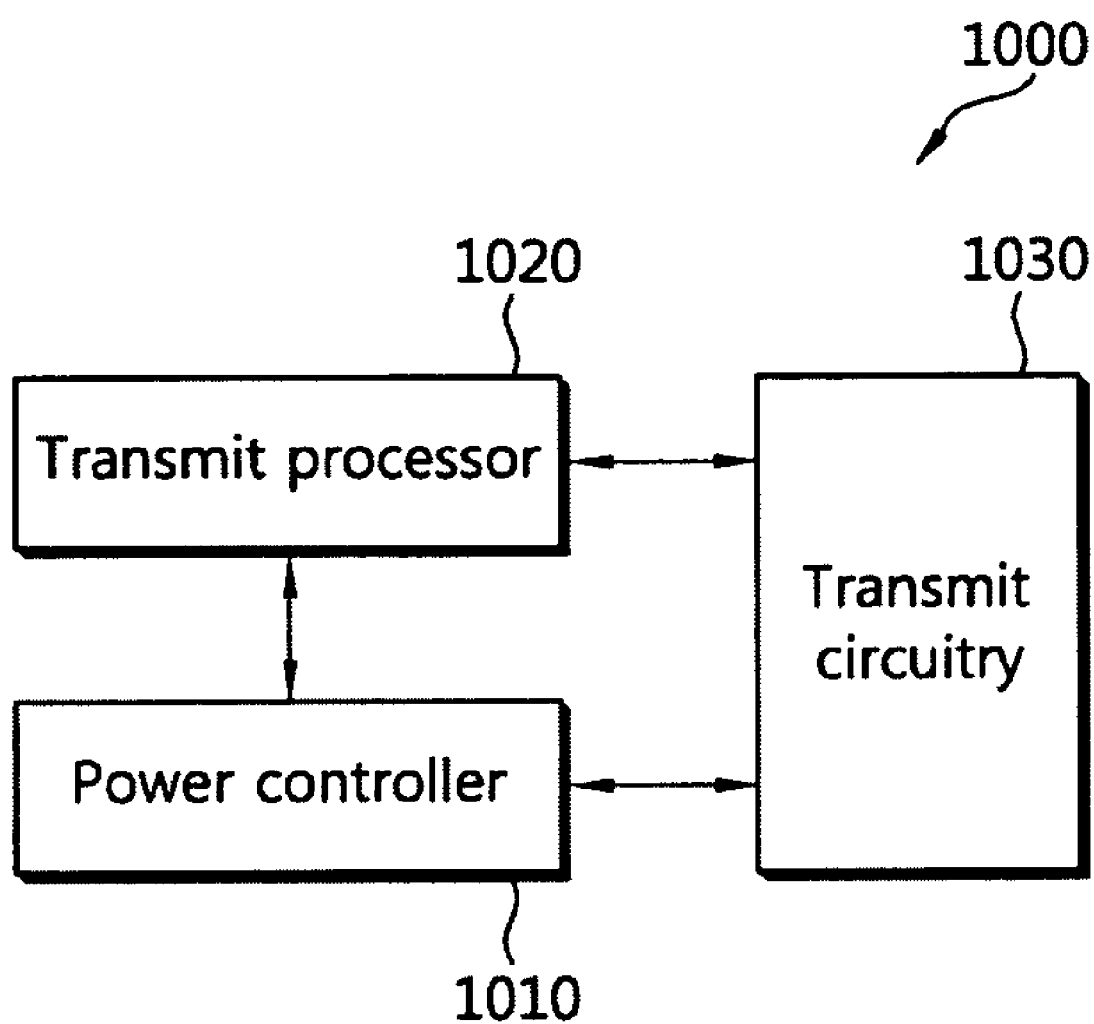
FIG. 10 shows a block diagram of a transmitter according to an embodiment of the present invention.

FIG. 10 shows a block diagram of a transmitter according to an embodiment of the present invention. A transmitter 1000 may be a part of UE. The transmitter 1000 includes a transmit processor 1010, a power controller 1020 and a transmit circuitry 1030. The transmit processor 1010 processes information bits to generate a transmit signal. Well known processes such as channel encoding and modulation may be performed by the transmit processor 1010. The power controller 1020 determines MPR and adjusts a maximum output power by using the MPR. The power controller 1020 determines a transmit power within the adjusted maximum output power. The method of FIG. 9 may be implemented in the power controller 1020. The transmit circuitry 1030 transmits the transmit signal by using the transmit power determined by power controller 1020.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling an uplink transmit power in a wireless communication, performed by a user equipment (UE), the method comprising:
    acquiring a resource allocation for uplink transmission from a base station (BS);
    determining a maximum power reduction (MPR) based on the resource allocation;
    adjusting a maximum output power by using the MPR;
    determining a transmit power of a uplink channel within the adjusted maximum output power; and
    transmitting an uplink data on the uplink channel,
    wherein the resource allocation comprises a number of contiguous resource blocks in a channel bandwidth and a starting index which is an index of a resource block with the lowest index among the contiguous resource blocks, and the channel bandwidth is divided into a first region, a second region and a third region,
    wherein the MPR is determined according to the number of the contiguous resource blocks in the first region and the third region, and the MPR is determined according to the starting index in the second region,
    wherein the MPR in the third region increases as the number of the contiguous resource blocks decreases.

2. The method of claim 1, wherein the first region includes a resource block with smallest index among entire resource blocks in the channel bandwidth, and the third region includes a resource block with largest index among the entire resource blocks.

3. The method of claim 2, wherein the nearest region from a public safety band is the first region.

4. The method of claim 3, wherein the public safety band is ranged from 769 MHz to 775 MHz.

5. The method of claim 2, wherein the number of the entire resource blocks in the channel bandwidth is 50.

6. The method of claim 2, wherein the first region includes resource blocks with indexes ranged from #0 to #12, the second region includes resource blocks with indexes ranged from #13 to #36, and the third region includes resource blocks with indexes ranged from #37 to #49.

7. The method of claim 1, wherein the channel bandwidth is 10 MHz.

8. The method of claim 7, wherein an operating band for the channel bandwidth is ranged from 777 MHz to 787 MHz.

9. The method of claim 1, wherein the MPR is determined in the third region by following equation:

$$CB - CC * \log_{10}(CRB)$$

where CB and CC are parameters and CRB is the number of contiguous resource blocks.

10. The method of claim 1, wherein the MPR in the second region is defined when the number of contiguous resource blocks is larger than a threshold.

11. The method of claim 10, wherein the second region is divided into two parts according to the starting index and the thresholds for each part are differently defined.

12. The method of claim 10, wherein the MPR in the second region is set to zero when the staring index is near the boundary of the third region.

13. A transmitter comprising:
a transmit circuitry to transmit a transmit signal;
a power controller configured to:
determine a MPR based on resource allocation;
adjust a maximum output power by using the MPR; and
determine a transmit power of the transmit signal within the adjusted maximum output power,
wherein the resource allocation comprises a number of contiguous resource blocks in a channel bandwidth and a starting index which is an index of a resource block with the lowest index among the contiguous resource blocks, and the channel bandwidth is divided into a first region, a second region and a third region,
wherein the MPR is determined according to the number of the contiguous resource blocks in the first region and the third region, and the MPR is determined according to the starting index in the second region,
wherein the MPR in the third region increases as the number of the contiguous resource blocks decreases.

14. The transmitter of claim 13, wherein the first region includes a resource block with smallest index among entire resource blocks in the channel bandwidth, and the third region includes a resource block with largest index among the entire resource blocks.

15. The method of claim 14, wherein the nearest region from a public safety band is the first region.

16. The transmitter of claim 15, wherein the public safety band is ranged from 769 MHz to 775 MHz.

17. The transmitter of claim 13, wherein the MPR is determined in the third region by following equation:

$$CB-CC*\log_{10}(CRB)$$

where CB and CC are parameters and CRB is the number of contiguous resource blocks.

18. The transmitter of claim 13, wherein the MPR in the second region is defined when the number of contiguous resource blocks is larger than a threshold.

19. The transmitter of claim 18, wherein the second region is divided into two parts according to the starting index and the thresholds for each part are differently defined.

20. The transmitter of claim 18, wherein the MPR in the second region is set to zero when the staring index is near the boundary of the third region.

* * * * *